C. A. RHONEMUS.
SHEET GLASS DRAWING APPARATUS.
APPLICATION FILED DEC. 30, 1919.
1,391,406.
Patented Sept. 20, 1921.
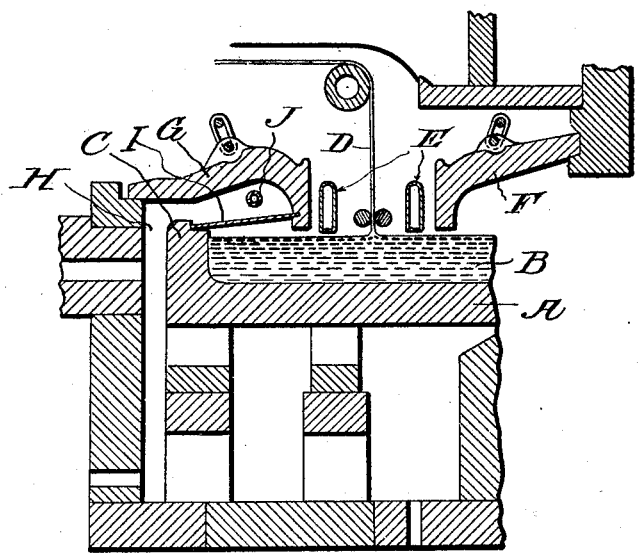
Inventor
Clarence A. Rhonemus,
By Mauro, Cameron, Lewis & Massaw
Attorneys

UNITED STATES PATENT OFFICE.

CLARENCE A. RHONEMUS, OF CHARLESTON, WEST VIRGINIA, ASSIGNOR TO THE LIBBEY-OWENS SHEET GLASS COMPANY, OF TOLEDO, OHIO, A CORPORATION OF OHIO.

SHEET-GLASS-DRAWING APPARATUS.

1,391,406.     Specification of Letters Patent.     Patented Sept. 20, 1921.

Application filed December 30, 1919. Serial No. 348,319.

*To all whom it may concern:*

Be it known that I, CLARENCE A. RHONEMUS, a citizen of the United States of America, residing at Charleston, Kanawha county, West Virginia, have invented certain new and useful Improvements in Sheet-Glass-Drawing Apparatus, of which the following is a specification, reference being had therein to the accompanying drawing.

This invention relates to improvements in sheet glass drawing apparatus and particularly to the means for controlling the temperature of the glass adjacent to the drawing point whereby portions of such glass are heated by radiating heat as distinguished from the direct application of burning gases as usually employed; and the invention further consists in the construction and arrangement of the various parts as more fully hereinafter described and particularly pointed out in the claims.

The drawing is a vertical central section through a sheet glass drawing apparatus embodying my invention.

In the use of the Colburn process and apparatus for drawing sheet glass which is illustrated—for instance—in Patent 1,248,809, issued December 4, 1917, the glass is melted and flowed through a refining tank and into the drawing tank, from which it is drawn vertically, and thence over a bending roll, horizontally, through a drawing chamber and into a leer. My present invention is shown as applied to such an apparatus as shown and described in the aforesaid Colburn patent, although it may be used in connection with other drawing devices.

In the drawing, A is the drawing tank into which the molten glass, B, flows continuously from the melting and refining tank, going in from the right-hand end, as shown in the drawing; at the other end is a wall, C, which forms the end wall of the drawing tank. D represents the sheet of glass, which is drawn vertically from an intermediate point in the drawing tank; E, water coolers which are placed adjacent the two sides of the sheet for the purpose of tempering the glass in the drawing tank, adjacent the drawing point; F, a curtain tile to prevent the burning gases from going too freely from the refining chamber; G, a roof tile which covers the end of the tank A, being spaced from the wall C to allow burning gases to pass up through the flue H and into the space beneath the cover tile to heat the glass in the end of the tank to the desired temperature.

In the use of this apparatus, for some reason which I do not understand the burning gases passing under the edge of the roof tile, deposit on the adjacent cooler E a coating, which, unless it is removed, very greatly reduces the efficiency of the cooler and affects the quality of the glass drawn. To prevent this trouble, therefore, I arrange a plate, of any suitable material, such as graphite, as shown at I, extending from the wall C to the suspended edge of the roof tile and which entirely closes off the glass in the end of the tank from the direct action of the flames at that point.

I may, and preferably do, place in the chamber beneath the roof tile G suitable burner or burners J and direct them downward upon the plate I so that the heat will be radiated through that plate onto the glass in the end of the tank to keep it at the desired temperature. I find that the use of radiated heat for maintaining the glass at the desired temperature obviates the difficulty of the scale, above referred to, and gives the desired result. Any desired means of applying radiated heat to the glass at this point may be employed as being within the scope of my invention.

What I claim as my invention is:—

1. In a sheet glass drawing apparatus, a receptacle for molten glass from which the sheet is drawn, a cooler for the sheet adjacent the drawing point, gaseous heating means above the molten glass for heating the surface glass, and a shield between the heating means and the glass, transmitting the heat downwardly therethrough, but preventing direct contact of the hot gases with the cooler.

2. In a sheet glass drawing apparatus, the combination of a receptacle for molten glass from which the sheet is drawn, coolers adjacent the drawing point, a roof tile above one end of the receptacle, a protecting plate over the glass in that end of the receptacle, the plate and roof tile inclosing a heating chamber above the glass, and gaseous heating means in the chamber, the protecting plate transmitting the heat to the molten glass but preventing the passage of the heated gases.

3. In a sheet glass drawing apparatus, the combination with a shallow tank into which molten glass continuosly flows from one end, a roof tile having a downturned end over the other end of the tank, a substantially horizontal plate extending from said downturned end to the end of the tank above the level of the glass, and heating means between said plate and tile.

In testimony whereof I hereunto affix my signature.

CLARENCE A. RHONEMUS.